United States Patent [19]

Bayley et al.

[11] Patent Number: 5,436,103
[45] Date of Patent: Jul. 25, 1995

[54] MODIFIED UNSATURATED POLYESTERS

[75] Inventors: Robert D. Bayley, Fairport; Carol A. Fox, Farmington; Thomas R. Hoffend, Webster; James R. Paxson, Walworth, all of N.Y.

[73] Assignee: Xerox Corporation, Stamford, Conn.

[21] Appl. No.: 112,523

[22] Filed: Aug. 27, 1993

[51] Int. Cl.$^6$ .................... G03G 9/00; C08G 59/00
[52] U.S. Cl. ..................... 430/109; 528/87; 528/103; 528/112; 528/176; 528/185; 528/272; 528/296; 528/298; 528/301; 528/302; 528/303; 528/306; 528/307; 528/308.6
[58] Field of Search ............... 528/272, 296, 298, 301, 528/302, 303, 306, 307, 308.6, 87, 103, 112, 176, 185; 430/109

[56] References Cited

U.S. PATENT DOCUMENTS

| | | | |
|---|---|---|---|
| 3,590,000 | 6/1971 | Palermiti et al. | 430/110 |
| 3,681,106 | 8/1972 | Burns et al. | 430/120 |
| 4,217,406 | 8/1980 | Tanaka et al. | 430/137 |
| 4,271,249 | 6/1981 | Gilliams et al. | 430/101 |
| 4,314,049 | 2/1982 | Yasuda | 528/128 |
| 4,331,755 | 5/1982 | Gilliams et al. | 430/106 |
| 4,387,211 | 6/1983 | Yasuda et al. | 528/179 |
| 4,533,614 | 8/1985 | Fukimoto | 430/99 |
| 4,556,624 | 12/1985 | Gruber et al. | 430/110 |
| 4,657,837 | 4/1987 | Morita et al. | 430/109 |
| 4,788,122 | 11/1988 | Kawabe et al. | 430/109 |
| 4,797,339 | 1/1989 | Maruyama et al. | 430/109 |
| 4,804,622 | 2/1989 | Tanaka et al. | 430/109 |
| 4,845,002 | 7/1989 | Niki et al. | 430/109 |
| 4,849,495 | 7/1989 | Funato et al. | 528/194 |
| 4,863,824 | 9/1989 | Uchida et al. | 430/109 |
| 4,863,825 | 9/1989 | Yoshimoto et al. | 430/99 |
| 4,866,158 | 9/1989 | Kubo et al. | 528/272 |
| 4,980,448 | 12/1990 | Tajiri et al. | 528/194 |
| 4,988,794 | 1/1991 | Kubo et al. | 528/272 |
| 4,996,291 | 2/1991 | Yoshinaka et al. | 528/272 |
| 5,015,724 | 5/1991 | Kawabe | 528/272 |
| 5,057,392 | 10/1991 | McCabe et al. | 430/109 |
| 5,057,596 | 10/1991 | Kubo et al. | 528/272 |
| 5,089,547 | 2/1992 | McCabe et al. | 524/262 |
| 5,106,715 | 4/1992 | Matsumura et al. | 430/110 |
| 5,112,715 | 5/1992 | DeMejo et al. | 430/109 |
| 5,147,747 | 9/1992 | Wilson et al. | 430/109 |
| 5,156,937 | 10/1992 | Alexandrovich et al. | 430/110 |
| 5,202,212 | 4/1993 | Shin et al. | 430/109 |
| 5,227,460 | 7/1993 | Mahabadi et al. | 528/272 |
| 5,262,513 | 11/1993 | Tanaka et al. | 528/272 |
| 5,266,432 | 11/1993 | Hayashi et al. | 430/109 |
| 5,276,127 | 1/1994 | Takyu et al. | 528/194 |

*Primary Examiner*—Samuel A. Acquah
*Attorney, Agent, or Firm*—Oliff & Berridge; Eugene O. Palazzo

[57] ABSTRACT

Modified unsaturated linear polymers have at least a first residue, a second residue and an acid residue. The first, second and acid residues correspond to a first, second and acid monomers used to prepare the polymers. The first monomer may be a diacid, anhydride, diacid ester or mixture thereof. The second monomer may be a diol or glycol. The acid monomer may be an aromatic dicarboxylic acid, different than the first monomer. The first residue is present in a concentration not less than about 7.5 mole % and the acid residue is present in a concentration ranging between 2.5 mole % and 12.5 mole %, based on the total mole monomer ratio of the polymer. The polymers have a glass transition temperature ranging from about 54° C. to about 64° C.

16 Claims, No Drawings

MODIFIED UNSATURATED POLYESTERS

FIELD OF THE INVENTION

The invention is directed to modified, unsaturated polyester polymers, particularly useful for preparing low fix temperature, densely cross-linked toner resins. Toners made from cross-linked toner resins comprising the inventive modified polymers have improved blocking performance.

BACKGROUND OF THE INVENTION

Toners which melt at lower temperatures have become an industry standard. Conventional electrophotographic processes require temperatures of 160°-200° C. to fix toner on a support medium, e.g., a sheet of paper or transparency, creating a developed image. Such high temperatures may reduce or minimize fuser roll life, such as fuser rolls made of silicone rubbers or fluoroelastomers (e.g., Viton ®), limit fixing speeds, or necessitate higher power usage during operation, such as in a xerographic copier employing a hot roll fixing mechanism.

Electrophotographic toners are generally prepared by mixing or dispersing a colorant and possibly a charge enhancing additive into a thermoplastic binder resin, followed by micropulverization. Known, conventional thermoplastic binder resins include polystyrenes, styreneacrylic resins, styrene-methacrylic resins, polyesters, epoxy resins, acrylics, urethanes and copolymers thereof. Carbon black is often used as a colorant and alkyl pyridinium halides, distearyl dimethyl ammonium methyl sulfate, and the like are employed as charge enhancing additives.

Although many processes exist for fixing toner to a support medium, hot roll fixing, transferring heat very efficiently, is especially suited for high speed electrophotographic processes. In this method, a support medium carrying a toner image is transported between a heated fuser roll and a pressure roll, the image face contacting the heated fuser roll. Upon contact with the fuser roll, the toner melts and adheres to the support medium, permanently fixing an image.

Toner fixing performance may be characterized as a function of temperature. The lowest temperature at which the toner adheres to the support medium is called the cold offset temperature: the maximum temperature at which the toner does not adhere to the fuser roll is called the hot offset temperature. When the fuser temperature exceeds a hot offset temperature, molten toner may adhere to the fuser roll during fixing, be subsequently transferred to substrates (phenomenon known as "offsetting") and result in blurred images. Between the cold and hot offset temperatures of the toner is the minimum fix temperature, the minimum temperature at which acceptable adhesion of the toner to the support medium occurs. The difference between the minimum and hot fix temperatures is called the fusing latitude.

The hot roll fixing system described above and a number of toners presently used therein exhibit several problems. First, the binder resins in the toners can require a relatively high temperature in order to be affixed to the support medium. This may result in high power consumption, low fixing speeds, and reduced fuser roll and roll bearing life. Offsetting itself can present a problem.

Toner resin which has a low fix temperature, below 200° C. ("low melt toner resin"), preferably below 160° C., exhibits good offset temperature performance. Toners operating at lower temperatures reduce power needs and increase component life. Low melt toners reduce volatilization of release oil, such as silicone oil, which may occur during high temperature operation and cause problems when the volatilized oil condenses on other areas of the machine. Toners with a wide fusing latitude, providing liberal requirements for oil used as a release agent and improved particle elasticity, may minimize copy quality deterioration related to toner offset. Hence, the desirability of low-fix temperature toner resins, particularly for use in hot-roll fixing electrophotographic processes, is apparent.

Contemporary artisans skilled in toner resin technology have developed resins having a lower minimum fix temperature than previously available commercial resins. These resins have a lower molecular weight than other, higher fix temperature resins. U.S. Pat. No. 3,590,000 to Palermiti et al. and U.S. Pat. No. 3,681,106 to Burns et al. disclose attempts to use polyester resins as a toner binder. Although a minimum fix temperature of polyester binder resins can be lower than resins made from other materials, such as styreneacrylic and styrene-methacrylic resins, this may lead to an undesirable lower hot offset temperature, thus resulting in a decreased offset resistance. These lower molecular weight resins generally suffer from an unacceptable borderline glass transition temperature, which negatively impacts blocking of the toner occurring during toner storage.

Contemporary polyester resins used in toners, which may have advantageous lower fix temperatures than earlier toner resins, may yield poor, unacceptable toner performances over long storage periods under extreme operating conditions because the resin has a glass transition temperature lying in a range of values which differentiate between acceptable and unacceptable transition temperatures. With these borderline transition temperature resins, in a hot-roll fixing system operating at elevated temperature, heat generated by the system during high volume cycling will cause toner stored in a toner reservoir over a period of time to agglomerate, a phenomenon known as "blocking".

Upon exposure to heat, toner particles which exhibit undesirable blocking performance will begin to associate with adjacent toner particles. If temperature exceeds an experimentally-determined threshold value, the toner particles form "blocks" of agglomerated toner and thus become unsuitable for further use as toner.

Blocking performance of a toner is directly related to the glass transition temperature of the toner resin used to prepare the toner. As the glass transition temperature of the resin decreases, the temperature at which blocking of the toner occurs also drops. Polyester resins exhibiting low glass transition temperatures, yet having desirable operating characteristics, are often undesirable for use as toner resins because of poor blocking performance.

Known polyester resins, which exhibit such low fix temperature and other desirable characteristics as discussed above, often suffer from the above-mentioned drawbacks, rendering the toner resins undesirable for use in commercial toner applications.

Skilled artisans, attempting to overcome limitations of known polyester resins, have modified the resin structures by branching, cross-linking and grafting, using conventional polymerization and condensation reactions. Such processes may result in resins having one or more desirable characteristics of known polyester resins, including offset resistance. Burns, mentioned above, discloses non-linear modification of a polymer backbone by mixing a trivalent or more polyol or polyacid with monomer to generate branching during polycondensation, resulting in a resin having improved offset resistance. However, too much branching may result in an increased minimum fix temperature, diminishing any advantage of a polymer thus modified.

Similarly, U.S. Pat. No. 4,533,614 to Fukumoto et al discloses a non-linearly modified, low-melting polyester containing: 1) an alkylsubstituted dicarboxylic acid and/or an alkyl-substituted diol; 2) a trivalent or more polycarboxylic acid and/or a trivalent or more polyol; 3) a dicarboxylic acid; and 4) an etherated diphenol. The main acid component of the polyester requires 50 mole %, preferably 60 mole %, or more of an aromatic dicarboxylic acid, its analogous anhydride, or other dicarboxylic acids to impart sufficient electrophotographic charge characteristics to a toner made from the resin. Fukimoto discloses that modified polyesters having less than the disclosed, required amount of aromatic acid do not impart sufficient charge characteristics to a toner made from the disclosed resin.

However, efforts to produce low-cost polyester resins that exhibit rheological properties required in producing highly desirable low melt toner resins, without borderline glass transition temperatures, have been unsuccessful. Prior to this invention, poor blocking performance in commercially reproduced polyester resins remained a concern.

Poor resin blocking performance may have prevented use of resins, otherwise having desirable resin characteristics. The modified linear polymers of the invention provide inexpensive, higher-performing linear base resin alternatives without undesirable borderline glass transition temperatures.

The inventive linear polymer may be cross-linked to produce densely cross-linked toner resins that may be prepared for use in toners. U.S. patent application No. 07/814,782 discloses cross-linked toner resins, prepared by a process as also disclosed in U.S. patent application No. 07/814,641, both to Mahabadi et al. The disclosures of these two patent applications are entirely incorporated herein by reference.

SUMMARY OF THE INVENTION

The invention overcomes the above-discussed disadvantages of the prior art, by providing a low temperature fixable resin which, when subsequently densely cross-linked in a known cross-linking reaction process, for eventual use in toners, exhibits desirable and durable blocking performance for use in conventional xerographic systems. The invention provides a low cost, modified polyester polymer, capable of undergoing subsequent crosslinking (e.g., in a reactive extrusion process) to obtain densely cross-linked toner resins for use in toners having an increased glass transition temperature and improved blocking performance. The inventive polymers do not compromise other essential characteristic features of well-performing toners resins.

From the inventive, modified polyester polymers, cross-linked toner resins may be prepared using known processes. The toner resins prepared from the inventive polymers can be sufficiently fixed at low temperatures (e.g., below 200° C., preferably below 160° C.) by hot-roll fixing, yet have a high enough resistance to blocking that they withstand extreme conditions of high-frequency cycling in a hot-roll environment.

When glass transition temperature of a toner resin falls between 50°–55° C. or lower, a toner made from a subsequently cross-linked polyester polymer exhibits unfavorable blocking performance when stored, particularly in toner cartridges. Surface additives can be put on the surface of the toner to improve blocking, but might be too high in concentration, resulting in other unfavorable properties. Incorporation of a substituted aromatic dicarboxylic residue into the inventive polymer increases its glass transition temperature sufficiently to obtain polymers which do not result in toners having borderline blocking performance.

The inventive polymer preferably has a glass transition temperature ranging from about 54° C. to about 64° C., preferably ranging from about 570° C. to 60° C.

The inventive polymer preferably has an acid residue concentration (derived from the acid monomer) ranging from about 2.5 mole % to about 12.5 mole %, based on the total mole ratio of the monomer composition. A first residue (derived from the first monomer) is present in a concentration not less than 7.5 mole %, based on the total mole ratio of the monomer composition, and preferably ranging from about 37.5 mole % to 47.5 mole %.

The modified polyester polymer may be prepared by a polycondensation, polyesterification or other known reaction process. The inventive polymer is thus a reaction product of diols, unsaturated or saturated first monomers (or combinations thereof) and an acid monomer. Preferably, the acid monomer is a substituted aromatic dicarboxylic acid.

The polyesters according to the invention may be prepared by first reacting an acid monomer and a second monomer and subsequently reacting with a first monomer, prior to polycondensation under vacuum.

In a process for preparing the inventive, unsaturated, modified polyester polymer, a first monomer, second monomer and acid monomer may be mixed, esterified and polycondensed under vacuum at a reaction temperature and for a reaction time to form the desired modified polymer.

DETAILED DESCRIPTION OF PREFERRED EMBODIMENTS

The inventive unsaturated, modified polyester polymers overcome the disadvantages of conventional linear base resins. The inventive polymers, incorporating a more rigid acid monomer than employed in conventional polyester polymers, increase the glass transition temperature of resins made from the polymers such that the resins have more desirable blocking characteristics. The acid monomer is preferably a substituted aromatic dicarboxylic acid or diester of the acid monomer. The inventive modified polymer has a glass transition temperature ranging from about 54° C. to about 64° C., preferably ranging from about 57° C. to 60° C. In the inventive polymer, an acid residue (derived from the acid monomer unit) concentration may range from about 2.5 mole % to about 12.5 mole % based on the total mole ratio of the monomer. A first residue (derived from the first monomer) may be present in a concentration not less than 7.5 mole %, preferably no more than about 47.5 mole %, based on the total mole ratio of the monomer.

The inventive resin achieves more desirable blocking performance without compromising physical characteristics of a final, cross-linked toner resin. When cross-linked, the inventive modified polymers exhibit a desirable minimum fix temperature, hot offset temperature and glass transition temperature, which correspondingly impart improved blocking performance to toners resulting therefrom. The inventive polymers are particularly useful as cross-linked toner resins and exhibit more desirable blocking characteristics as compared with commercially available, less desirable cross-linked resins.

The polymer, and cross-linked toner resins made therefrom, exhibit rheological behavior comparable with high performing resins possessing required low minimum fix temperatures. Yet, the inventive resins have improved blocking performance due to an increase in glass transition temperature. In addition, the inventive polymers, when cross-linked for use as toner resins, also exhibit good offset properties and wide fusing latitudes as compared with known, cross-linked resins. Due to these combined properties, the cross-linked toner resins prepared from the inventive modified polymer do not suffer from poor blocking performance.

The inventive, low-melt, modified polyester polymer has repeating units of a reaction product of a first and second monomer and an acid monomer corresponding to first, second and acid residues of the polymer, respectively.

Monomers suitable for preparing the inventive modified resins are reacted by step-wise reactions between a first monomer and second monomer, and acid monomer. The first monomer is selected among unsaturated diacids and diesters (or anhydrides) but can be a combination with selected saturated diacids and diesters (or anhydrides). The second monomer may be an at least dihydric alcohol (glycol or diol).

The resulting unsaturated, modified polyesters according to the invention are reactive (e.g., crosslinkable) on two fronts: (a) unsaturation sites (double bonds) along the polyester chain, and (b) other functional groups in the polyester, such as carboxyl, hydroxy, etc., which are amenable to reactions, e.g., acid-base reactions.

Typical unsaturated polyester base resins useful for this invention may be prepared by melt polycondensation, polyesterification or other polymerization processes using diacids, diesters and/or anhydrides as first monomers and diols or glycols as second monomers, and substituted acid monomers. Suitable saturated diacids and/or anhydrides include, but are not limited to, succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, the like and mixtures thereof. Preferred unsaturated diacids and/or anhydrides include maleic acid, fumaric acid, chloromaleic acid, itaconic acid, citraconic acid, mesaconic acid, maleic anhydride, the like and mixtures thereof.

Suitable diols and glycols include, but are not limited to, propylene glycol, ethylene glycol, diethylene glycol, neopentyl glycol, dipropylene glycol, dibromoneopentyl glycol, propoxylated bisphenol-A, ethoxylated bisphenol-A, 2,2,4-trimethylpentane-1,3-diol, tetrabromo bisphenol dipropoxy ether, 1,4-butanediol, the like and mixtures thereof. Preferred diols should be soluble in solvents such as, for example, tetrahydrofuran, toluene and the like.

Preferred unsaturated polyesters are prepared from diacids and/or anhydrides, such as, for example, maleic anhydride, fumaric acid, the like and mixtures thereof, and diols such as, for example, propoxylated bisphenol-A, propylene glycol, the like and mixtures thereof. A particularly preferred polyester is prepared from propoxylated bisphenol-A as the second monomer and fumaric acid as the first monomer, and 5-t-butyl-1,3-benzenedicarboxyic acid as the acid monomer.

An exemplary substituted aromatic dicarboxylic acid may be an acid such as 5-tertbutyl-1,3-bezenedicarboxylic acid, but any aromatic, dicarboxylic acid which increases the Tg of the inventive polymers may be employed.

The weight average molecular weight, Mw, of the inventive polymer, may be in the range of about 5,000 to 20,000 and the number average molecular weight, Mn, of the inventive polymer, may be in the range of about 2,000 to about 6,000.

The inventive copolymers may be manufactured by step-wise or simultaneous reaction between the first monomer, second monomer and acid monomer. Preferably, the second monomer and acid monomer are esterified, and the esterification product of this process is esterified with the first monomer.

In a process for preparing the inventive unsaturated modified polymer, a reaction vessel is used to conduct polymerization of the monomer components of the inventive copolymer. Weighed amounts of the above discussed monomer materials are placed in the reactor and a homogeneous solution heated to a temperature at which a clear melt of the starting materials may be obtained, at which time a catalyst may be added to promote subsequent polymerization. During reaction, volatile by-products such as alcohol, glycols and water are removed from the reaction system. Polymerization and reaction temperatures range from about 150° C. to about 250° C. Excess starting diol material may be removed under vacuum. Total reaction times may range from about 1 to about 5 hours. The linear modified polymer may then be densely cross-linked by known cross-linking reactions.

Densely cross-linked toner resins made using the inventive polymers, cross-linked using a reactive extrusion process, such as for example, the process disclosed in Mahabadi, supra, comprise cross-linked portions and linear portions. Reactively extruded polymer resins of the invention comprise very high molecular weight, densely cross-linked microgel particles, insoluble in substantially any solvent, including tetrahydrofuran, toluene and the like. The linear portion comprises low molecular weight resin soluble in various solvents such as for example tetrahydrofuran, toluene and the like. High molecular weight, highly cross-linked gel particles are substantially uniformly distributed in the linear portions. Substantially no portion of the reactively extruded cross-linked, inventive polyester resin comprises sol or low density cross-linked polymer, such as that which would be obtained in conventional cross-linking processes, such as polycondensation, bulk, solution, suspension, emulsion and dispersion polymerization processes.

Resins prepared from the inventive polymers are generally present in a toner made from the inventive polymers in an amount of from about 40 to about 98 percent by weight, and more preferably from about 70 to about 98 percent by weight, although they may be present in greater or lesser amounts, provided that the objectives of the invention are achieved. Toner resins prepared from polymers may be subsequently melt blended or otherwise mixed with a colorant, charge carrier additives, surfactants, emulsifiers, pigment dispersants, flow additives, and the like. The toner product can then be pulverized by known methods such as milling to form toner particles. The toner particles preferably have an average volume particle diameter of about 5 to about 25, more preferably about 5 to 15, microns.

Various suitable colorants can be employed in toners of the invention, including suitable colored pigments, dyes, and mixtures thereof including Carbon Black, such as Regal 330 ® carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Final Pink, Hostaperm Pink, Lithol Red, Rhodamine Lake B, Brilliant Carmine, Heliogen Blue, Hostaperm Blue, Neopan Blue, PV Fast Blue, Cinquassi Green, Hostaperm Green, titanium dioxide, cobalt, nickel, iron powder, Sicopur 4068 FF and iron oxides such as Mapico Black (Columbia), NP608 and NP604 (Northern Pigment), Bayferrox 8610 (Bayer), MO8699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner and about 5 to about 60 percent by weight for black toner.

Various known suitable effective positive or negative charge enhancing additives can be selected for incorporation into the toner compositions prepared using the inventive polymers, preferably in an amount of about 0.1 to about 10, more preferably about 1 to about 3, percent by weight. Examples include quaternary ammonium compounds inclusive of alkyl pyridinium halides; alkyl pyridinium compounds; organic sulfate and sulfonate compositions; cetyl pyridinium tetrafluoroborates; distearyl dimethyl ammonium methyl sulfate; aluminum salts such as Bontron E84 ™ or E88 ™ (Hodogaya Chemical) and the like.

Additionally, other internal and/or external additives may be added in known amounts to impart known functions to the resulting toners. The selected carrier particles can be used with or without a coating, the coating generally being comprised of fluoropolymers, such as polyvinylidene fluoride resins, terpolymers of styrene, methyl methacrylate, and a silane, such as triethoxy silane, tetrafluoroethylenes, other known coatings and the like.

The toners or developers made from the inventive polymers can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll at a temperature lower than 200° C., preferably lower than 160° C.

While the invention has been described with reference to particular preferred embodiments, the invention is not limited to the specific embodiments or examples provided. Other embodiments, modifications and products can be made by those skilled in the art without departing from the spirit and scope of the invention.

EXAMPLE I

A poly(propoxylated bisphenol A fumarate) polymer is prepared by the following procedure. A 3 liter glass reactor is assembled with a stainless steel helical anchor stirrer and a high vacuum stirrer bearing adaptor, glass thermometer well and 250° C. thermometer, inert gas inlet adaptor, water-jacketed vigreux column fixed with a Dean Stark trap and condenser, and a full length heating mantle controlled with a $I^2R$ Thermowatch Regulator attached to the thermometer.

1613.00 grams (4.689 moles) of propoxylated bisphenol A (SYNFAC 8029, lot 1060 obtained from Milliken Chemicals), 557.0 grams (4.798 moles) of fumaric acid are added to the reactor. After the reactor and its contents reached 135° C., the obtained slurry is argon sparged for approximately 20 minutes to remove dissolved oxygen. Heating is allowed to continue to approximately 190° C.

Water from esterification is removed using the Dean Stark trap/condenser system until 159 grams (about 81% of theoretical) of water are removed. At this time the reactor is connected to the high vacuum trap system with two inline dry ice traps and the reactor contents raised to 200° C. A vacuum is slowly applied and maintained at about 100 microns for one hour thirty-three minutes, during which two samples are obtained, Sample I is analyzed and found to have a melt index of 46 grams per ten minutes at 117° C./2.160 Kg and a Tg of 56.6° C. as measured on a Perkin Elmer DSC-4. Sample II has a melt index of 26 grams per ten minutes at 117° C./2.160 Kg and a Tg of 57.0° C., as measured on a Perkin Elmer DSC-4.

EXAMPLE II

A poly(propoxylated bisphenol A fumarate) polymer is prepared by the following procedure. A 3 liter glass reactor is assembled with the reaction system components as specified in Example I.

1613.00 grams (4.689 moles) of propoxylated bisphenol A (SYNFAC 8029, lot 1060 obtained from Milliken Chemicals), 557.0 grams (4.798 moles) of fumaric acid are added to the reactor. After the reactor and its contents reached 135° C., the obtained slurry is argon sparged for approximately 20 minutes to remove dissolved oxygen. Heating is allowed to continue to approximately 190° C.

Water from esterification is removed using the Dean Stark trap/condenser system until 145 grams (about 74% of theoretical) of water is removed. At this time the reactor is connected to the high vacuum trap system with two inline dry ice traps and the reactor contents raised to 200° C. A vacuum is slowly applied and maintained at about 50 microns. After three hours twenty minutes, the resin is removed from the reactor. Upon analysis it has a melt index of 62 grams per ten minutes at 117° C./2.160 Kg and a Tg of 54.6° C. as measured on a Perkin Elmer DSC-4.

EXAMPLE III

A commercialy prepared poly(propoxylated bisphenol A-cofumarate) polymer, shown here for comparison, is found to have a melt index of 52 grams per ten minutes at 117° C./2.160 Kg and a Tg of 55.4° C., as measured on a Perkin Elmer DSC-4. Gel permeation chromatography of the polymer confirmed a Mw of 13,400, Mn of 6,200 and a MWD of 2.16. This polymer is representative of a commercialy prepared poly(-propoxylated bisphenol A fumarate) polymer.

EXAMPLE IV

A poly(propoxylated bisphenol A fumarate/5-tertbutyl-1,-3-benzenedicarboxylate) polymer is prepared by the following procedure. A 3 liter glass reactor is assembled with the reaction system components as specified in Example I.

900.00 grams (2.616 moles) of propoxylated bisphenol A (SYNFAC 8029, lot 1060 obtained from Milliken Chemicals), and 119.7 grams (0.539 moles) of 5-t-butyl-1,3-benzene dicarboxylic acid are added to the reactor. After the reactor and its contents reach 135° C., a clear melt is obtained. The melt is argon sparged for approximately 20 minutes to remove dissolved oxygen.

The reactor is heated to a temperature of about 235° C. and water is removed using the Dean Stark trap/condenser system until about 10.0 grams are collected. At this point 250.7 grams (2.160 moles) of fumaric acid and 0.68 grams of hydroquinone free radical inhibitor are added to the reactor and the reactor contents now maintained at about 200° C. by cooling. Water is further removed until about 63.0 grams (about 67% theoretical) is obtained. The reactor is connected to the high vacuum trap system with two inline dry ice traps and the reactor contents maintained at about 200° C. A vacuum is slowly applied and maintained at from about 50 to 150 microns. Over a period of two hours and 45 minutes, four polymer samples are taken and later analyzed for Melt Index, GPC, and Tg. The results are recorded in Table 1.

TABLE 1

| SAMPLE IDENTIFICATION | Melt Index at 117° C./ 2.160 Kg | Tg (°C.) | Mw/Mn/MWD K |
|---|---|---|---|
| Sample I | 102 | 56.7 | 6.5/2.7/2.4 |
| Sample II | 64 | 59.3 | 7.7/3.1/2.5 |
| Sample III | 47 | 60.0 | 8.9/3.3/2.7 |
| Sample IV | 32 | 61.0 | 10.3/3.5/3.0 |

EXAMPLE V

A poly(propoxylated bisphenol A fumarate/5-tbutyl-1,-3-benzenedicarboxylate) polymer is prepared by the following procedure. A 3 liter glass reactor is assembled with the reaction system components as specified in Example I.

900.00 grams (2.616 moles) of propoxylated bisphenol A (SYNFAC 8029, lot 1060 obtained from Milliken Chemicals), and 119.7 grams (0.539 moles) of 5-t-butyl-1,3-benzene dicarboxylic acid are added to the reactor. After the reactor and its contents reach 135° C., a clear melt is obtained. The melt is argon sparged for approximately 20 minutes to remove dissolved oxygen.

The reactor is heated to a temperature of about 230° C. and water is removed using the Dean Stark trap/condenser system until about 15.4 grams are collected. At this point 250.7 grams (2.160 moles) of fumaric acid and 0.68 grams of hydroquinone free radical inhibitor are added to the reactor and the reactor contents are maintained at about 200° C. by cooling. Water is further removed until about 64.4 grams (about 68% theoretical) is obtained. The reactor is connected to the high vacuum trap system with two inline dry ice traps and the reactor contents maintained at about 200° C. A vacuum is slowly applied and maintained at from about 50 to 150 microns. During one hour of total vacuum, one sample is taken at 41 minutes, and the final sample at the end of the one hour of vacuum. The first sample is found to have a melt index of 52 grams per ten minutes at 117° C./2.160 Kg and a Tg of 59.2° C., as measured on a Perkin Elmer DSC-4. Gel permeation chromatography of the polymer confirms a Mw of 8,400, Mn of 3,100 and a MWD of 2.7. The final sample, which is the bulk of the polymer, has a melt index of 23 grams per ten minutes at 117° C./2.160 Kg and a Tg of 64.0° C., as measured on a Perkin Elmer DSC-4. Gel permeation chromatography of the polymer confirm a Mw of 13,300, a Mn of 3,800 and a MWD of 3.5.

In comparison, the Tg of the 52 melt index polymer above, is 2.6° C. higher than sample I of EXAMPLE I. The Tg of the final sample above is 6.8° C. higher, compared to the 26 melt index sample of EXAMPLE I. The EXAMPLE V samples demonstrate a Tg increase due to the incorporation of 5-t-butyl-1,3benzene dicarboxylic acid.

EXAMPLE VI

A poly(propoxylated bisphenol A fumarate/5-tbutyl-1,-3-benzenedicarboxylate) polymer is prepared by the following procedure. A 3 liter glass reactor is assembled with the reaction system components as specified in Example I.

1800.00 grams (5.232 moles) of propoxylated bisphenol A (SYNFAC 8029, lot 1060 obtained from Milliken Chemicals), and 237.4 grams (1.078 moles) of 5-t-butyl-1,3-benzene dicarboxylic acid are added to the reactor. After the reactor and its contents reach 135° C., a clear melt is obtained. The melt is argon sparged for approximately 20 minutes to remove dissolved oxygen.

The reactor is heated to a temperature of about 240° C. and water removed using the Dean Stark trap/condenser system until about 32.0 grams are collected. At this time 501.4 grams (4.320 moles) of fumaric acid is added to the reactor and the reactor contents are maintained at about 200° C. Water is further removed until about 141.0 grams (about 75% theoretical) is obtained. The reactor is connected to the high vacuum trap system with two inline dry ice traps and the reactor contents maintained at about 200° C. A vacuum is slowly applied and maintained at from about 50 to 150 microns. At the end of one hour and 12 minutes of vacuum, the polymer is dropped from the reactor. The Polymer is found to have a melt index of 52 grams per ten minutes at 117° C./2.160 Kg and a Tg 58.8° C. as measured on a Perkin Elmer DSC-4, showing good reproducibility and scale up of EXAMPLE V, first sample, which has a melt index of 52 grams per ten minutes at 117° C./2.160 Kg and a Tg of 59.2° C.

What is claimed is:

1. A toner composition comprising a modified unsaturated linear polymer, said polymer having a glass transition temperature ranging from about 54° C. to about 64° C. and comprising a) a first residue of a first monomer, said first monomer being selected from the group consisting of diacids, anhydrides, diacid esters and mixtures thereof and said first residue being present in a concentration not less than about 7.5 mole %, based on the total mole ratio of the polymer; b) a second residue of a second monomer, said second monomer being selected from the group consisting of diols and glycols; and c) an acid residue of an acid monomer, said acid monomer being a substituted aromatic dicarboxylic acid that increases said glass transition temperature of said unsaturated linear polymer and that is different from said first residue being present in a concentration from about 2.5 mole % to about 12.5 mole % based on the total mole ratio of the monomer composition.

2. The toner composition according to claim 1, wherein the weight average molecular weight, $M_w$, of said polymer is in the range of about 5,000 to about 20,000 and the number average molecular weight, $M_n$, is in the range of about 2,000 to 6,000.

3. The toner composition according to claim 1, wherein the glass transition of said polymer ranges from about 57° C. to 60° C.

4. The tone composition according to claim 1, wherein the first residue is present in a concentration of ranging from about 37.5 mole to about 47.5 mole %.

5. The tone composition according to claim 1, wherein the said acid monomer is 5-tert-butyl-1,3-benzene dicarboxylic acid.

6. The tone composition according to claim 1, wherein said first monomer is selected from the group consisting of succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and esters thereof.

7. A modified unsaturated linear polymer, said polymer having a glass transition temperature ranging from about 54° C. to about 64° C. and comprising a) a first residue of a first monomer selected from the group consisting of maleic acid, fumaric acid, chloromaleic acid, itaconic acid, citraconic acid, mesaconic acid, maleic anhydride and esters thereof, said first residue being present in a concentration not less than about 7.5 mole %, based on the total mole ratio of the polymer; b) a second residue of a second monomer, said second monomer being selected from the group consisting of diols and glycols; and c) an acid residue of an acid monomer, said acid monomer being a substituted aromatic dicarboxylic acid that increases said glass transition temperature of said unsaturated linear polymer and that is different from said first residue being present in a concentration from about 2.5 mole % to about 12.5 mole % based on the total mole ratio of the monomer composition.

8. The tone composition according to claim 1, wherein said second monomer is selected from the group consisting of propylene glycol, ethylene glycol, diethylene glycol, neopentyl glycol, dipropylene glycol, dibromoneopentyl glycol, propoxylated bisphenol-A, ethoxylated bisphenol-A, 2,2,4-trimethyl-pentane-1,3-diol, tetrabromo bisphenol dipropoxy ether, 1,4-butanediol and mixtures thereof.

9. A modified unsaturated linear polymer, said polymer having a glass transition temperature ranging from about 54° C. to about 64° C. and comprising a) a first residue of a first monomer, said first monomer being selected from the group consisting of diacids, anhydrides, diacid esters and mixtures thereof and said first residue being present in a concentration not less than about 7.5 mole %, based on the total mole ratio of the polymer; b) a second residue of a second monomer, said second monomer being selected from the group consisting of diols and glycols; and c) an acid residue of an acid monomer, said acid monomer being a substituted aromatic dicarboxylic acid that increases said glass transition temperature of said unsaturated linear polymer and that is different from said first residue being present in a concentration from about 2.5 mole % to about 12.5 mole % based on the total mole ratio of the monomer composition, wherein the first monomer, second monomer and acid monomer are respectively selected from the group consisting of: maleic anhydride, fumaric acid, and mixtures thereof; propoxylated bisphenol A, propylene glycol and mixtures thereof; and 5-tert-butyl-1,3-benzene dicarboxylic acid.

10. The polymer according to claim 9, wherein the first monomer is fumaric acid and the second monomer is propoxylated bisphenol A, and the acid monomer is 5-tert-butyl-1,3-benzene dicarboxylic acid.

11. A process for preparing a modified unsaturated linear polymer, comprising:
polycondensing first and second monomers and an acid monomer, said first monomer being selected from the group consisting of maleic acid, fumaric acid, chloromaleic acid, itaconic acid, citraconic acid, mesaconic acid, maleic anhydride and esters thereof; said second monomer being selected from the group consisting of diols and glycols; and said acid monomer being a substituted aromatic dicarboxylic acid that increases the said glass transition temperature of said unsaturated linear polymer and that is different from said first monomer, at a reaction temperature and for a reaction time to form the modified unsaturated linear polymer, wherein the polymer has a glass transition temperature ranging from about 54° C. to about 64° C. and comprises at least:

a) a first residue of said first monomer, said first residue being present in a concentration not less than about 7.5 mole %, based on the total mole ratio of the polymer;

b) a second residue of said second monomer; and c) an acid residue of said acid monomer, said acid residue being present in a concentration ranging from about 2.5 mole % to about 12.5 mole % of the total mole ratio of the polymer.

12. The process according to claim 11, wherein the polymerizing occurs under a vacuum to remove reaction by-products.

13. The process according to claim 11, wherein the reaction temperature ranges from about 150° C. to about 250° C.

14. The process according to claim 11, wherein the reaction time ranges from about 1 hour to about 5 hours.

15. The process according to claim 11, wherein the acid monomer and second monomers are first reacted, prior to polycondensing, and subsequently reacted with the first monomer.

16. The process according to claim 11, wherein the first and second monomers and acid monomer are simultaneously reacted.

* * * * *

UNITED STATES PATENT AND TRADEMARK OFFICE
CERTIFICATE OF CORRECTION

PATENT NO. : 5,436,103
DATED : July 25, 1995
INVENTOR(S) : Robert D. BAYLEY et al.

It is certified that error appears in the above-indentified patent and that said Letters Patent is hereby corrected as shown below:

Column 11,

Claim 4, line 1, change "tone" to --toner--.

Claim 5, line 1, change "tone" to --toner--.

Claim 6, line 1, change "tone" to --toner--.

Claim 8, line 1, change "tone" to --toner--.

Signed and Sealed this

Tenth Day of September, 1996

Attest:

BRUCE LEHMAN

Attesting Officer     Commissioner of Patents and Trademarks